United States Patent
Fert et al.

(10) Patent No.: US 11,060,462 B2
(45) Date of Patent: Jul. 13, 2021

(54) AIRCRAFT TURBOMACHINE COMPRISING A HEAT EXCHANGER OF THE PRECOOLER TYPE

(71) Applicant: SNECMA, Paris (FR)

(72) Inventors: Jérémy Edmond Fert, Moissy-Cramayel (FR); Eric De Vulpillieres, Moissy-Cramayel (FR); Julien Pavillet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 376 days.

(21) Appl. No.: 15/104,445

(22) PCT Filed: Dec. 15, 2014

(86) PCT No.: PCT/FR2014/053349
§ 371 (c)(1),
(2) Date: Jun. 14, 2016

(87) PCT Pub. No.: WO2015/092251
PCT Pub. Date: Jun. 25, 2015

(65) Prior Publication Data
US 2017/0002747 A1    Jan. 5, 2017

(30) Foreign Application Priority Data
Dec. 19, 2013   (FR) ...................................... 1362956

(51) Int. Cl.
*F02C 9/18*    (2006.01)
*F02C 7/14*    (2006.01)
(Continued)

(52) U.S. Cl.
CPC ................ *F02C 9/18* (2013.01); *B64D 13/00* (2013.01); *B64D 27/10* (2013.01); *B64D 29/00* (2013.01); *F01D 25/24* (2013.01); *F01D 25/30* (2013.01); *F02C 6/08* (2013.01); *F02C 7/14* (2013.01); *F02C 7/141* (2013.01); *B64D 15/04* (2013.01); *B64D 2013/0618* (2013.01); *F05D 2220/323* (2013.01); *F05D 2260/213* (2013.01); *Y02T 50/60* (2013.01)

(58) Field of Classification Search
CPC .......... F01D 25/24; F01D 25/28; F01D 25/30; F02C 7/18; F02C 6/08; F02C 9/18;
(Continued)

(56) References Cited

U.S. PATENT DOCUMENTS 5,123,242 A * 6/1992 Miller ....................... F02C 7/14
                                                          165/300
7,810,312 B2 * 10/2010 Stretton .................. F02C 7/141
                                                          60/226.1
(Continued)

FOREIGN PATENT DOCUMENTS

EP        2 492 199 A2    8/2012

OTHER PUBLICATIONS

International Search Report dated Mar. 26, 2015, issued in corresponding International Application No. PCT/FR2014/053349, filed Dec. 15, 2014, 3 pages.

(Continued)

*Primary Examiner* — Richard A Edgar
*Assistant Examiner* — Aye S Htay
(74) *Attorney, Agent, or Firm* — Christensen O'Connor Johnson Kindness PLLC

(57) ABSTRACT

An aircraft turbomachine including a nacelle and an engine further including at least one outflowing jet of air, wherein a heat exchanger of the precooler type for supplying air to the aircraft is mounted in the nacelle. The exchanger includes a primary circuit, the inlet of which is connected to a supply of compressed air from the engine and the outlet of which is connected to an air supply for supplying air to the aircraft, and a secondary circuit supplied with air taken from said air flow.

11 Claims, 4 Drawing Sheets

(51) Int. Cl.
  *B64D 13/00* (2006.01)
  *F02C 6/08* (2006.01)
  *B64D 27/10* (2006.01)
  *B64D 29/00* (2006.01)
  *F01D 25/24* (2006.01)
  *F01D 25/30* (2006.01)
  *F02C 7/141* (2006.01)
  *B64D 15/04* (2006.01)
  *B64D 13/06* (2006.01)

(58) Field of Classification Search
  CPC ......... F02C 7/141; B64D 29/06; B64D 27/10; B64D 29/00; B64D 2013/0618
  USPC ........................................................ 415/178
  See application file for complete search history.

(56) References Cited

U.S. PATENT DOCUMENTS

| | | | | |
|---|---|---|---|---|
| 7,926,261 B2* | 4/2011 | Porte | ...................... | B64D 13/06 60/226.1 |
| 9,206,912 B2* | 12/2015 | Landre | ...................... | F16K 3/30 |
| 2003/0218096 A1* | 11/2003 | Marche | .................. | B64D 13/00 244/118.5 |
| 2007/0130912 A1* | 6/2007 | Kraft | ........................ | F02C 6/08 60/226.1 |
| 2008/0053059 A1* | 3/2008 | Giver | ....................... | F02C 7/14 60/226.1 |
| 2008/0072572 A1* | 3/2008 | Beutin | .................. | B64D 29/08 60/246 |
| 2008/0230651 A1 | 9/2008 | Porte | | |
| 2016/0312702 A1* | 10/2016 | Thomas | .................... | F02C 7/18 |

OTHER PUBLICATIONS

Written Opinion of the International Searching Authority dated Mar. 26, 2015, issued in corresponding International Application No. PCT/FR2014/053349, filed Dec. 15, 2014, 6 pages.

Written Opinion of the International Searching Authority dated Mar. 26, 2015, issued in corresponding International Application No. PCT/FR2014/053349, filed Dec. 15, 2014, 7 pages.

International Preliminary Report on Patentability dated Jun. 21, 2016, issued in corresponding International Application No. PCT/FR2014/053349, filed Dec. 15, 2014, 1 page.

* cited by examiner

AIRCRAFT TURBOMACHINE COMPRISING A HEAT EXCHANGER OF THE PRECOOLER TYPE

TECHNICAL FIELD

Embodiments of the present disclosure relate to an aircraft turbine engine, the turbine engine comprising a heat exchanger of the precooler type.

BACKGROUND

The prior art includes US-A1-2008/230651, EP-A2-2 492 199 and US-A1-2003/218096.

On board an aircraft, it is necessary to have a supply of hot air in order to be able to carry out specific functions, such as air-conditioning the cockpit and the passenger cabin or de-icing specific members of the aircraft. The hot air comes from the turbine engine of the aircraft and must undergo significant cooling before use. For this purpose, at least one heat exchanger is provided, which is generally referred to as a precooler, in which hot air which is taken off at the engine of a turbine engine is cooled by cooler air which is taken off in the fan duct or secondary duct of the turbine engine.

Each turbine engine is fixed by a strut to a portion of the aircraft, such as the fuselage thereof. In the current state of the art, the above-mentioned exchanger is mounted in the strut. The exchanger comprises a first air circuit, the input of which is connected by a line to means for taking off hot air, and the output is connected to means for supplying hot air to the aircraft. The air is taken off at the engine and transported to the first air circuit of the exchanger through a line which passes through the secondary duct to the inside of a structural arm and is then connected to the input of the first air circuit. The exchanger comprises a second air circuit which is supplied with air which is taken off in the fan duct of the turbine engine, the air then being discharged to the outside after exchanging heat with the air from the first air circuit, for the purpose of the cooling thereof.

Embodiments of the present disclosure propose an improvement to this technology.

SUMMARY

Embodiments of the present disclosure propose an aircraft turbine engine, comprising a nacelle and an engine defining at least one flow duct for an air flow, wherein a heat exchanger of the precooler type for supplying air to the aircraft is mounted in the nacelle, the exchanger having a primary circuit, the input of which is connected to means for taking off compressed air from the engine, and the output is connected to means for supplying air to the aircraft, and a secondary circuit which is supplied with air which is taken off in the air flow.

The disclosure thus proposes a new location for the heat exchanger or precooler, the exchanger being accommodated in the nacelle and not in the strut for connecting the turbine engine to the aircraft. Some aircraft manufacturers could indeed require the exchanger to be accommodated in the nacelle. This would make it possible in particular to facilitate access to this equipment because detaching the outer cowls from the nacelle can allow this access. In addition, it is conceivable for the exchanger to be supplied directly by the air flow which is taken off in the fan duct without it being necessary to connect the exchanger by means of a specific line to means for taking off air in the duct.

The disclosure thus makes it possible in particular to make the technology from the prior art simpler and lighter. Furthermore, this makes it possible to reduce the number of interfaces to the strut, since it is no longer necessary to take the two cold flow and hot flow pipes as far as the strut. Only the mixed and cooled air pipe is routed as far as the strut. This thus simplifies access to the strut and thus the attachment or detachment of the propulsion system to/from the aircraft. In addition, since the strut is a fire-free region (i.e. a region which is not protected in the event of a fire), the temperature of the air and skin of the pipe must not exceed a specific value. The fact that the interfaced pipe contains air cooled by the precooler makes it possible to limit or even eliminate the use of thermal blankets (for the skin temperature) or a double-skin pipe (to contain any leaks).

The exchanger is preferably fixed to an outer annular housing of the engine.

The outer annular housing is preferably designed to define the inside of the flow duct for the air flow, which comes for example from a fan of the turbine engine.

Advantageously, the outer annular housing is surrounded by nacelle walls and/or cowls which define an annular space around the outer annular housing, and the heat exchanger is mounted in the annular space.

The housing can comprise at least one recess for accommodating the exchanger, which is formed for example by a local deformation of the housing. This facilitates the integration of the exchanger in the nacelle. The exchanger can be fixed to a removable panel of the housing. The panel can be designed to define the recess. It is thus conceivable, for example during a maintenance operation, to remove the exchanger by detaching the panel from the housing.

The exchanger can be embedded in part in the housing and comprise a portion which protrudes from the inner surface of the housing. This protruding portion can define an input or intake for supplying air to the exchanger.

Advantageously, the exchanger comprises a heat exchange block which defines the primary and secondary circuits, a scoop for taking off air in the air flow and supplying the secondary circuit, and an exhaust nozzle for discharging the air leaving the secondary circuit. The exchange block, the scoop and the exhaust nozzle can be fixed directly to one another so as to form an integral assembly. The assembly can comprise air input and output manifolds which are connected to take-off and supply means of the primary circuit, respectively. The exchanger can further comprise a valve between the scoop and the exchange block or the exhaust nozzle, such as a valve having a flap/flaps.

The input of the scoop can open radially towards the inside and/or axially upstream, and the output thereof can open axially downstream and/or radially towards the outside. The input of the exhaust nozzle can open radially towards the inside and/or axially upstream, and the output thereof can open axially downstream and/or radially towards the outside. The housing can comprise, on a portion which is upstream of the recess, an opening which communicates with an input of the scoop.

Advantageously, the dimensions of the opening are dependent on those of the scoop. This makes it possible to reduce the dimensions of the opening so as to admit into the opening an air flow rate which is equal to or very slightly greater than the flow rate of air with which the exchanger is to be supplied via the scoop. The dimensions of the opening can thus be provided to be small enough relative to the dimensions of the housing that they do not significantly affect the rigidity of the housing, even if the housing is made of composite.

Preferably, the scoop protrudes at least in part into the duct so as to take off air (in the secondary duct) through the input thereof, and the exhaust nozzle comprises an output which opens out in the region of a cowl of the nacelle. The position of the scoop protruding into the duct allows the scoop to have an opening into the duct with a portion of the opening which intercepts the incident air flow.

Embodiments of the present disclosure also relate to a heat exchanger of the precooler type for a turbine engine such as described above, comprising a heat exchange block having primary and secondary circuits, air input and output manifolds of the primary circuit, a scoop which is designed to take off air in an air flow of the turbine engine and to supply the secondary circuit, an exhaust nozzle which is designed to discharge the air from the secondary circuit, and in that the block, the scoop, the exhaust nozzle and the manifolds are fixed to one another and to a panel of the housing so as to form an integral assembly.

The exchanger and the exchange block thereof are for example of the brick type.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
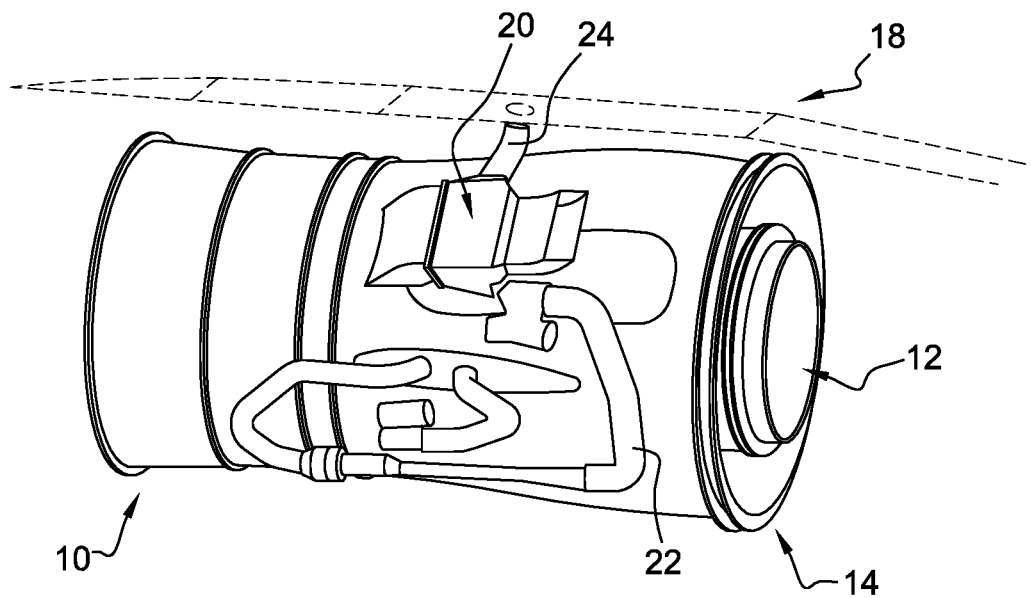
FIG. 1 is a schematic perspective view of an aircraft turbine engine according to the disclosure.

Reference is made firstly to FIG. 1, which shows a turbine engine 10 according to the disclosure for an aircraft, the turbine engine in this case being of the bypass type. The turbine engine 10 comprises an engine 12 having an outer housing 14 which defines an annular flow duct for a secondary flow. A primary flow flows inside the engine 12. In this case, the nacelle of the turbine engine is not shown for the sake of clarity.

The engine typically comprises, from upstream to downstream, in the direction of flow of the primary flow, at least one compression module, a combustion chamber, at least one turbine module and an exhaust nozzle for ejecting combustion gases.

The turbine engine 10 is fixed to a portion of the aircraft, such as the fuselage thereof, by means of a strut 18, of which only the structural elements are shown in FIG. 1.

As explained above, hot air which is taken off at the engine is cooled by means of a heat exchanger of the precooler type and supplied to the aircraft to carry out specific functions, such as air-conditioning the cockpit and the passenger cabin or de-icing specific members of the aircraft.

As shown in FIG. 1, the exchanger, generally designated 20, is mounted in the strut 18 and fixed to one of the structural elements of the strut 18

Figure 2:
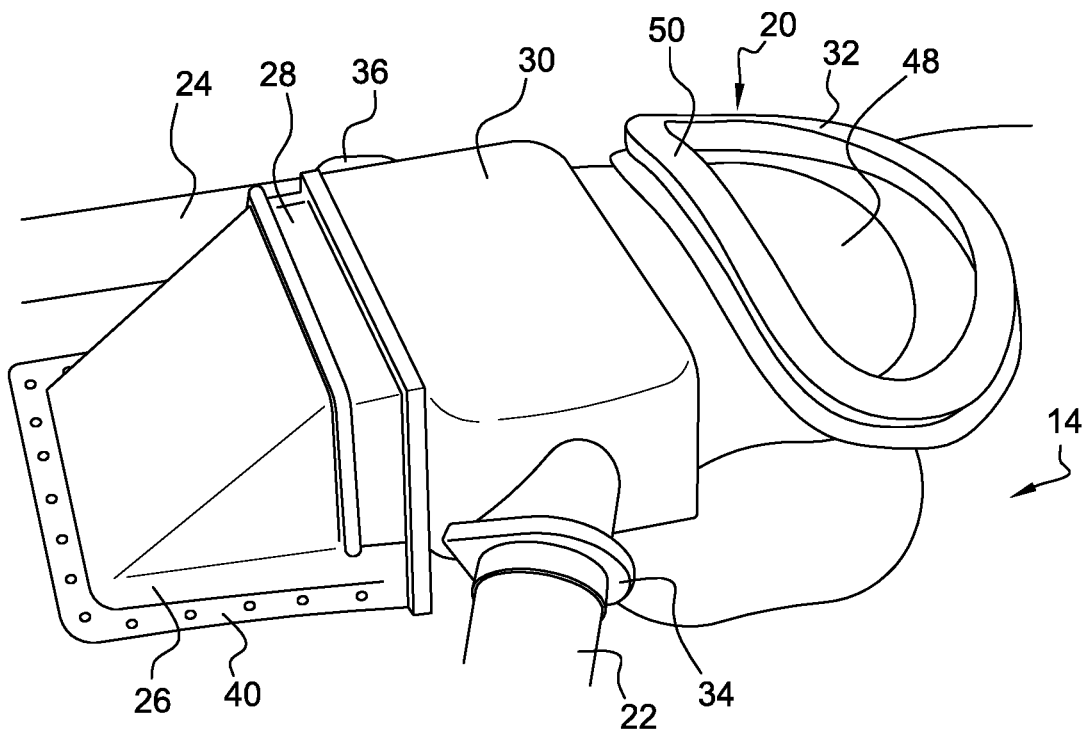
FIG. 2 is a schematic perspective view of a heat exchanger of the precooler type which is installed according to the disclosure.
Figure 3:
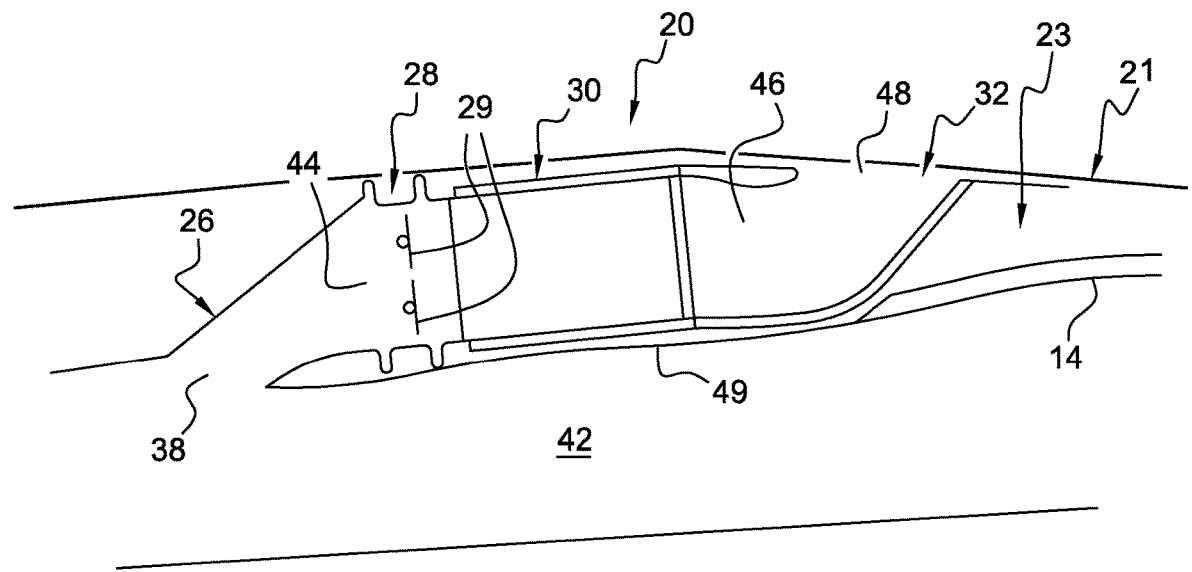
FIG. 3 is a schematic view in axial section of the exchanger from FIG. 2.

By contrast, according to the disclosure and as shown in particular in FIG. 2, the exchanger 20 is mounted in the nacelle, i.e. in a space 23 which is formed between the nacelle 21 (See FIG. 3) and the housing 14, and is preferably fixed to the housing 14, as shown in FIG. 3.

An exchanger 20 according to the disclosure can be seen more clearly in FIGS. 2 and 3. The exchanger 20 comprises two circuits, which are primary and secondary, respectively. The primary circuit, which is also referred to as the hot circuit, has an input which is connected by at least one line 22 to means for taking off hot air at the engine 12 (for example in the compression module), the output of the primary circuit being connected by at least one other line 24 to means for supplying hot air to the aircraft.

The secondary circuit, which is also referred to as the cold circuit, has an input which is connected to means for taking off air from the secondary flow of the turbine engine, the output of the circuit being connected to means for discharging air to the outside of the turbine engine.

In the example shown in particular in FIG. 2, the exchanger 20 comprises essentially six elements: a scoop 26 forming the means for taking off air from the secondary flow, a valve 28 for regulating the flow rate of air circulating in the secondary circuit, a heat exchange block 30 comprising for example bricks which define the primary and secondary circuits, an exhaust nozzle 32 which forms the means for discharging air from the secondary circuit, and air input 34 and output 36 manifolds, respectively, of the primary circuit.

In this case, the scoop 26 is fixed directly to the outer housing 14, sometimes referred to as an outer annular housing, by bolting. It comprises an input 38, which is shown in FIG. 3, or intake which is surrounded by a peripheral collar 40 which is applied and fixed to the outer surface of the outer housing 14. In the example shown, the input 38 of the scoop 26 communicates with an opening in the housing 14 and opens predominantly radially towards the inside in the flow duct 42, sometimes referred to as a fan duct, of the secondary flow (FIG. 3). It will be noted that in the region of the input 38 thereof, the scoop 26 has an opening into the duct with a small portion of the opening which intercepts the incident air flow, the direction of the incident air being shown in FIG. 3 by the straight line drawn below the reference numeral 42. The output 44 of the scoop 26 is oriented substantially axially downstream.

The valve 28 is mounted directly downstream of the scoop 26. The valve is for example a valve 28 having shutters 29, the valve comprising for example two shutters which are rotatably movable about axes which are transverse to the flow of the secondary flow in the scoop from a position for blocking the flow cross section of the valve to a position for unblocking the flow cross section.

The heat exchange block 30 can be of the type used in the prior art for this application.

The exhaust nozzle 32 is mounted directly in the output of the secondary circuit of the block 30, the input 46 thereof opening predominantly axially upstream and the output 48 thereof being oriented substantially radially towards the outside. As can be seen in FIG. 2, the peripheral edge of the exhaust nozzle 32, which defines the output 48, can be equipped with a sealing joint 50 which is intended to bear radially against the inner surface of a removable outer cowl (not shown) of the nacelle.

The above-mentioned six elements of the exchanger 20 in this case form an integral assembly. In the example shown in FIG. 4, the block 30 has a parallelepiped shape and comprises two opposing sides (upstream and downstream) which are connected to the exhaust nozzle 32 and the valve 28, respectively, and two other opposing sides which are respectively connected to the manifolds 34, 36, respectively, which are shown in FIG. 2. The size of the block 30 between the manifolds 34, 36 defines the hot run-length of the primary circuit, and the size of the block 30 between the valve 28 and the exhaust nozzle 32 defines the cold run-length of the secondary circuit.

In order to allow the integration of the exchanger 20, the housing 14 can comprise a localized recess 49 for receiving the exchanger. As a result, in FIG. 3, it can be seen that the flow cross section of the duct 42 is reduced in the region of the exchanger 20 due to this recess.

Figure 4:
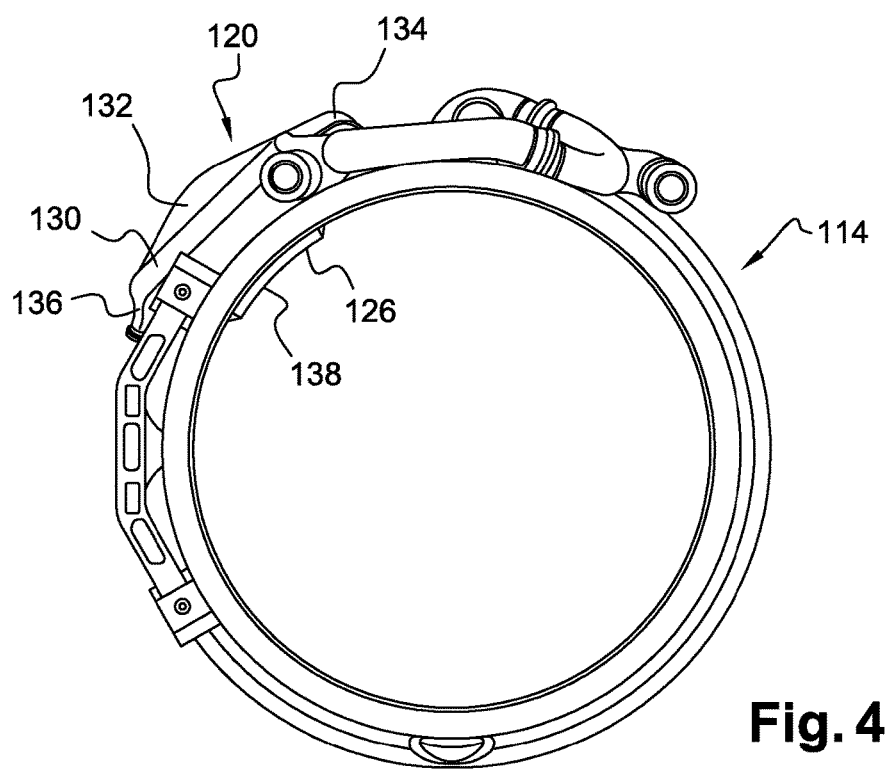
FIG. 4 is a schematic perspective front view of a housing supporting an exchanger, which is embedded in part in the housing.
Figure 5:
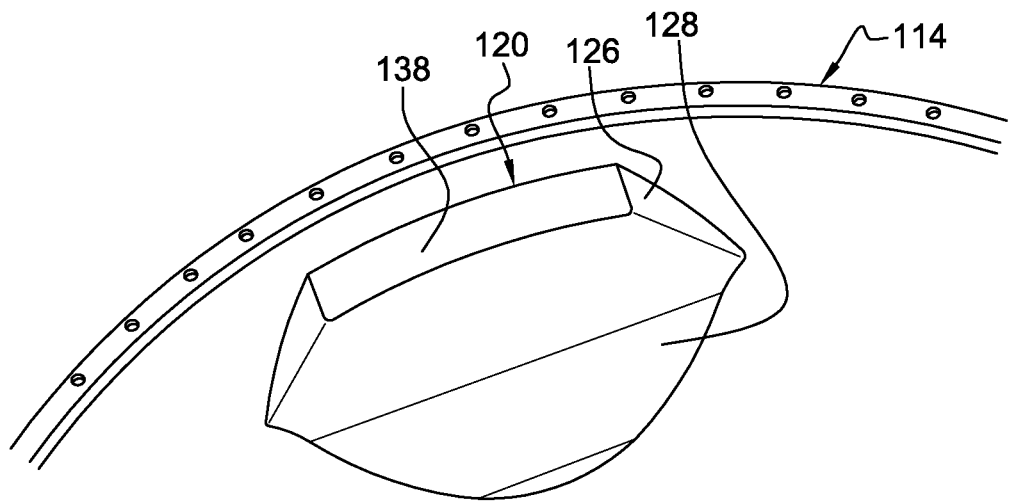
FIG. 5 is another schematic partial view in perspective of the housing and of the exchanger from FIG. 4.
Figure 6:
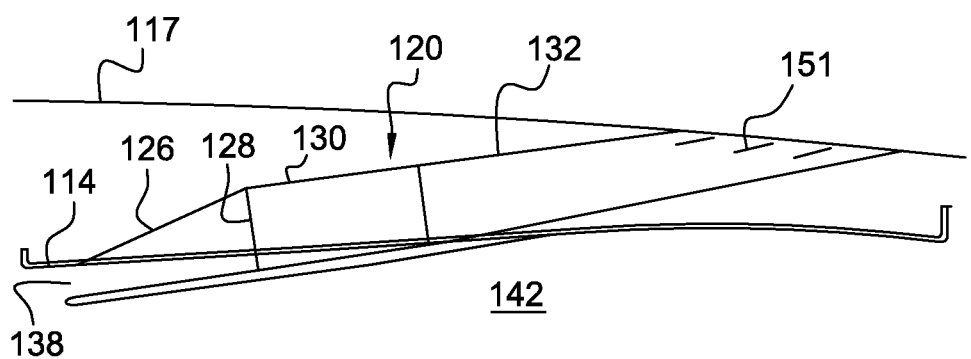
FIG. 6 is a schematic view in axial section of the exchanger from FIGS. 4 and 5.

FIGS. 4 to 6 show an alternative embodiment of the disclosure in which the exchanger 120 is embedded in part in the outer housing 114, the reference numeral 117 in FIG. 6 denoting the outer wall, or nacelle, of the outer housing 114 which generally comprises removable cowls.

The exchanger 120 comprises the same elements as the exchanger 20 described above, that is to say a scoop 126, a valve 128, a heat exchange block 130, an exhaust nozzle 132 and two manifolds 134, 136.

In the example shown, portions of the scoop 126 and the block 130 of the exchanger 120 are embedded in the housing 114 and protrude radially inside the housing 114. The protruding portions are thus located in the flow duct 142 for the secondary flow of the turbine engine. The input 138 of the scoop 126 opens predominantly axially upstream. Since the incident air flow is directed towards the rear, perpendicularly to the plane in FIG. 4, it can be seen that the scoop has an opening onto the duct with a portion of the opening which intercepts the incident air flow. This portion of the opening is produced through the input 138 of the scoop. In this case, the output of the exhaust nozzle 132 is equipped with an exhaust grating 151.

Figure 7:
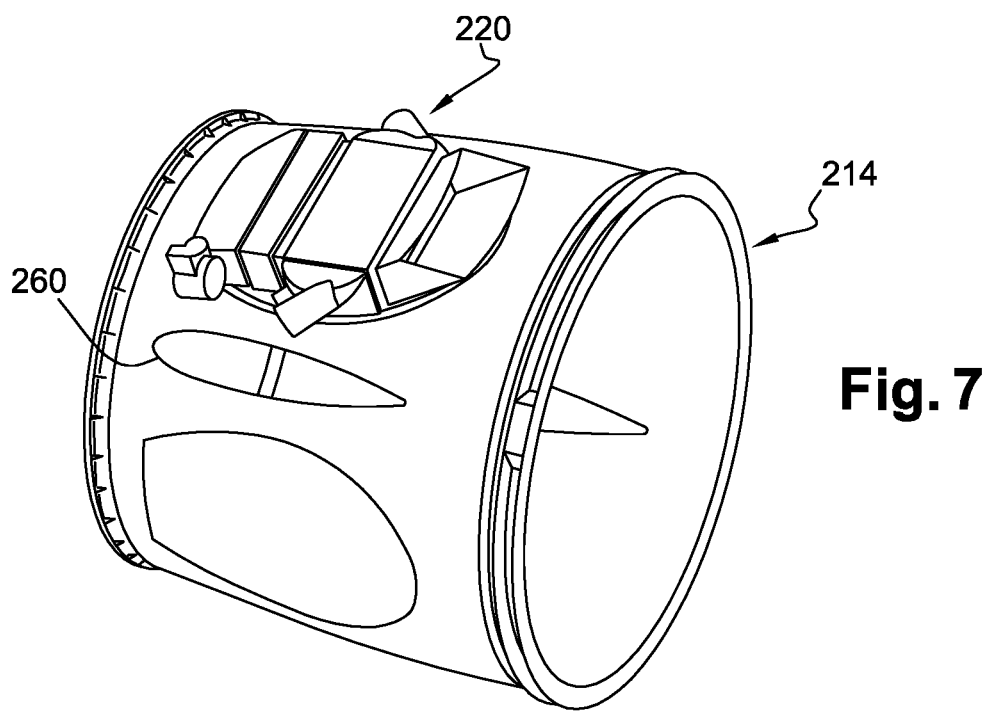
FIGS. 7 and 8 are schematic perspective views of a housing comprising two removable and interchangeable panels, one of which supports an exchanger according to the disclosure.
Figure 8:
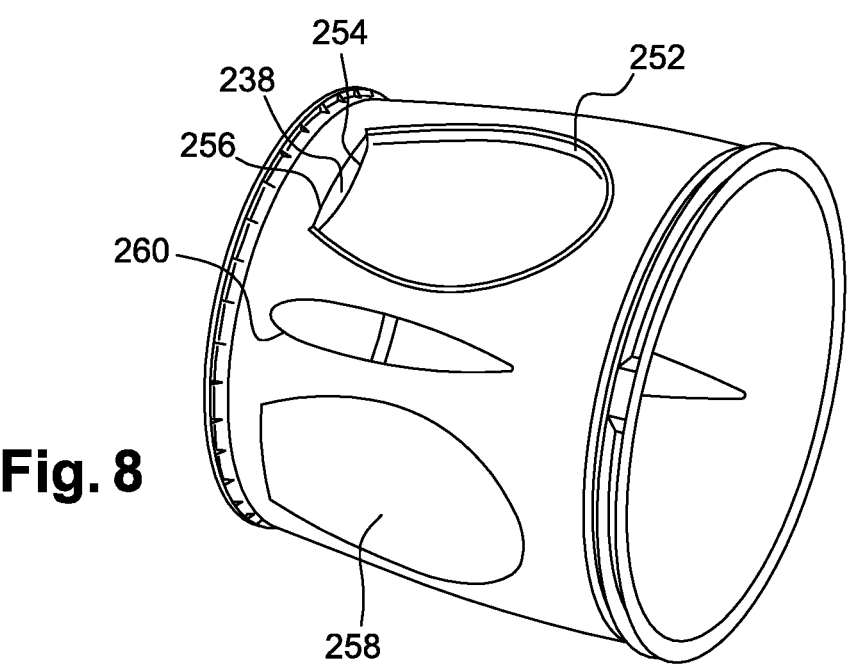

FIGS. 7 and 8 show another alternative embodiment of the disclosure, in which the above-mentioned recess in the outer housing 214 is defined by a removable panel 252 which is applied and fixed to the housing in order to block an opening thereof. The panel 252 is substantially egg-shaped, the peripheral edge thereof being fixed in a sealing manner to the peripheral edge of the opening in the outer housing 214 except in the region of the upstream end portion thereof. Indeed, the peripheral edge 254 of the upstream end portion of the panel 252 is radially offset towards the inside in relation to the corresponding peripheral edge 256 of the opening, and defines, together with the edge, the input 238 of the scoop of the exchanger 220. The exchanger is fixed directly to the panel 252.

The outer housing 214 comprises another opening, which is identical to the above-mentioned opening, and is closed by another panel 258 which is removable and interchangeable with the panel 252, i.e. each panel can be used to block one or the other of the openings in the housing 214. This facilitates the integration of the exchanger in two different positions on the housing 214. In this case, the panel 258 does not define a recess.

In the example shown in FIG. 8, the openings which are closed by the panels 252, 258 are located on either side of an orifice 260 in the housing 214 for mounting the 12oc arm (which stands for 12 o'clock arm, using the analogy of a clock face) of the turbine engine. The exchanger 220 can thus be positioned on either side of the arm, which allows the exchanger to be mounted on the side of the fuselage of the aircraft for each of the lateral turbine engines of an aircraft.

The operation of the heat exchanger 20, 120, 220 according to the disclosure is the same as that from the prior art for supplying air to an aircraft. The housing 14, 114, 214 can be made of a metal or composite.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An aircraft turbine engine, comprising:
   a nacelle; and
   an engine having a longitudinal axis and a fan duct for an air flow, the fan duct being delimited by an outer annular housing; and
   a heat exchanger configured as a precooler for supplying air to the aircraft, the heat exchanger having a primary circuit that includes an input and an output, the input of the primary circuit is connected to a compressed air line from the engine, and the output of the primary circuit is connected to an air supply line for supplying air to the aircraft, the heat exchanger also having a secondary circuit which is supplied with air taken off from said air flow of said fan duct,
   wherein the heat exchanger is fixed to the outer annular housing of the engine, the outer annular housing being surrounded by of the nacelle and spaced a distance from the nacelle such that the outer annular housing and the nacelle define therebetween an annular space discrete from and positioned radially outwardly of the fan duct with respect to said longitudinal axis, and wherein the heat exchanger is mounted in said annular space.

2. The aircraft turbine engine according to claim 1, wherein the outer annular housing comprises at least one recess for accommodating the heat exchanger which is formed by a local deformation of the outer annular housing.

3. The aircraft turbine engine according to claim 2, wherein the heat exchanger is fixed to a removable panel of the outer annular housing, said panel configured to define said recess.

4. The aircraft turbine engine according to claim 1, wherein the heat exchanger is embedded in part in the outer annular housing and comprises a portion which protrudes from an inner surface of the outer annular housing.

5. The aircraft turbine engine according to claim 1, wherein the heat exchanger comprises a heat exchange block which defines said primary and secondary circuits, a scoop for taking off air from said air flow and supplying the secondary circuit, and an exhaust nozzle for discharging the air leaving the secondary circuit.

6. The aircraft turbine engine according to claim 5, wherein said outer annular housing comprises, on a portion which is upstream of a recess, an opening which communicates with an input of said scoop.

7. The aircraft turbine engine according to claim 5, wherein said scoop protrudes at least in part into said fan duct so as to take off air through the input of the scoop, and wherein said exhaust nozzle comprises an output which opens out in a region of the nacelle.

8. The aircraft turbine engine according to claim 5, wherein the exchange block comprises air input and output manifolds which are connected to the take-off and supply of the primary circuit, respectively.

9. The aircraft turbine engine according to claim 5, wherein the heat exchanger comprises a valve between the scoop and the exchange block.

10. The aircraft turbine engine according to claim 5, wherein the heat exchange block, the scoop and the exhaust nozzle are fixed to one another and form an integral assembly.

11. An aircraft turbine engine, comprising:
a nacelle having walls or cowls;
an engine having a longitudinal axis and a fan duct for an air flow, the fan duct being delimited by an outer annular housing;
the outer annular housing being surrounded by the walls or cowls of the nacelle, the outer annular housing and the walls or cowls of the nacelle defining therebetween an annular space positioned radially outwardly of the fan duct with respect to said longitudinal axis;
a heat exchanger configured as a precooler for supplying air to the aircraft, the heat exchanger mounted in said annular space and fixed to the outer annular housing, the heat exchanger having a primary circuit that includes an input and an output, the input of the primary circuit is connected to a compressed air line from the engine, and the output of the primary circuit is connected to an air supply line for supplying air to the aircraft, the heat exchanger also having a secondary circuit which is supplied with air which is taken off from said air flow,
wherein the outer annular housing comprises at least one recess for accommodating the heat exchanger, the at least one recess formed by a local deformation,
wherein the heat exchanger comprises a heat exchange block which defines said primary and secondary circuits, a scoop for taking off air from said air flow and supplying the secondary circuit, and an exhaust nozzle for discharging the air leaving the secondary circuit,
wherein said outer annular housing comprises, on a portion which is upstream of the at least one recess, an opening in communication with an input of said scoop,
wherein said scoop protrudes at least in part into said fan duct so as to take off air through the input of the scoop and said exhaust nozzle comprises an output that opens out in a region of the nacelle.

* * * * *